Nov. 10, 1964　　　L. C. WILCOXEN　　　3,156,341
MOTOR MOUNT FOR CONVEYORS
Filed July 10, 1961
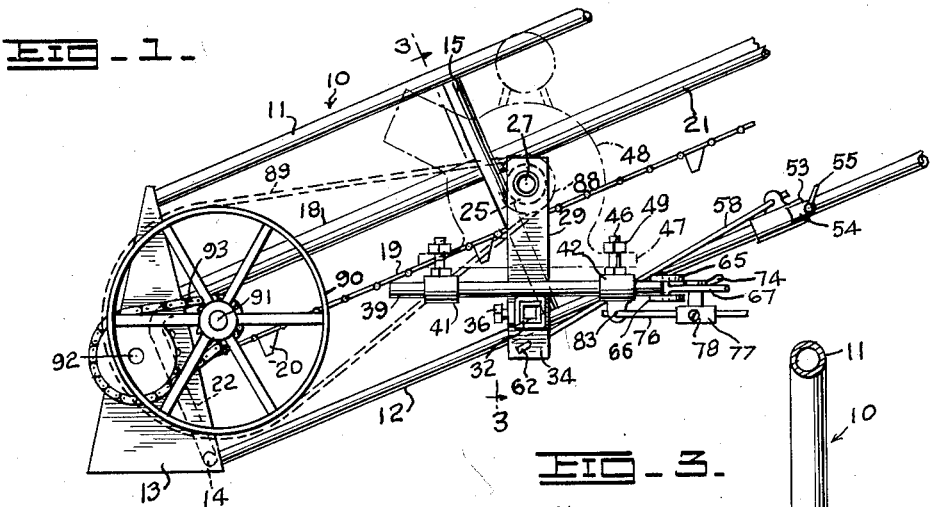
INVENTOR:
L.C. WILCOXEN
BY
Homer R. Montague
ATTORNEY

United States Patent Office 3,156,341  
Patented Nov. 10, 1964

3,156,341  
MOTOR MOUNT FOR CONVEYORS  
Leon C. Wilcoxen, Dodge City, Kans., assignor to Mayrath Machinery Company, Inc., a corporation of Kansas  
Filed July 10, 1961, Ser. No. 122,938  
3 Claims. (Cl. 198—233)

This invention relates to a motor mount for conveyors, and particularly to mobile, self-contained power conveyors adapter for conveying grain, hay bales, etc.

It is the common practice in conveyors of the general type referred to to support with respect to the conveyor a power source such as an electric motor or gasoline engine, and since it is desired to keep the power source level while providing for adjusting the inclination of the conveyor it has been proposed to provide leveling means for the power source.

An important object of the invention is to provide an improved novel type of motor mount which is characterized by simplicity in construction and ease of adjustment for leveling the base structure for the motor.

A further object is to provide such a motor mount wherein the base structure for the motor is suspended from a depending support which is adapted to swing freely for the leveling of the motor base, and which is provided with easily operable means for fixing the base in adjusted position to maintain the motor level for any angular adjustment of the conveyor.

A further object is to provide novel means for connecting to the conveyor frame the depending support which carries the motor base.

A further object is to provide a rigid tube welded or otherwise secured to certain elements of the conveyor frame and adapted to receive a similar element fixed to the depending motor support whereby such element is adapted to swing in the tubular member for the leveling of the motor base.

A further object is to provide a sleeve slidable on one of the conveyor frame members and provided with a link connecting it to the lower end of the depending motor support, and to provide a simple set screw for locking the sleeve in any position on its supporting frame member whereby, when the angularity of the conveyor is changed, the set screw may be loosened to permit the motor-supporting base to assume a horizontal position in any angled position of the conveyor, whereupon the set screw is tightened to fix the motor mount against swinging movement.

A further object is to provide novel means associated with slidable motor supporting elements for tightening the belt which transmits power from the motor or engine.

Other objects and advantages of the invention will become apparent during the course of the following description:

In the drawing I have shown one embodiment of the invention. In this showing

FIG. 1 is a fragmentary side elevation of a portion of a conveyor showing the invention applied.

FIG. 2 is an enlarged perspective view of the motor mount in its entirety, parts being shown separated for the purpose of illustration, and FIG. 3 is a fragmentary sectional view on line 3—3 of FIG. 1.

Referring to FIG. 1, the numeral 10 designates a conveyor structure as a whole, shown in the present instance as being of a type adapted for conveying and elevating hay bales. It will become apparent, however, that the invention is not limited to such type of conveyor. The conveyor itself is conventional and need not be illustrated in detail. In the present instance the conveyor is shown as being provided with upper and lower longitudinally extending preferably tubular main frame members 11 and 12 connected at their lower ends to preferably triangular structural supporting members 13 arranged at opposite sides of the conveyor. The members 13 are connected by a cross member 14. At spaced points therealong, the frame members 11 and 12 at each side of the machine are connected by vertical bracing frame members 15, one of which is shown in FIG. 1 and which assists in the manner to be described in supporting relative to the conveyor a motor mount comprising the present invention.

Centrally of its width, the conveyor is provided with a trough 18 in which travels an endless chain 19 having pushers 20 for moving hay bales and the like longitudinally along the conveyor to an upper point of discharge. At opposite sides of the trough are arranged rails 21 over which hay bales or other articles being conveyed are adapted to slide. These rails, which are arranged below the rails 11, cooperate therewith to guide the hay bales or other articles in their movement along the conveyor. The rails 21 at the entrance end of the conveyor have downturned ends 22 welded to the cross member 14. Suitable cross members, not shown, extend between the rails 21 to brace them with respect to each other and to support the trough 18.

Referring to FIG. 3, the numeral 25 designates a tubular supporting member extending transversely of the conveyor at one side thereof in the approximate location shown in FIG. 1. The inner end of the member 25 is arranged beneath the adjacent member 21 and is welded thereto to be supported thereby. Adjacent the right hand side of the conveyor in FIG. 3, that is the side toward the observer in FIG. 1, the tubular member 25 lies against and is firmly welded to the brace member 15 shown in FIG. 3. Thus the tubular member 25 is rigidly supported at its ends by the brace member 15 and by the adjacent rail member 21.

A tubular member 27 (FIGS. 2 and 3) is inserted in the tubular member 25 and is maintained against displacement to the right in FIG. 3 by a cotter pin 28. The outer end of the member 27 extends through an opening in the upper end of a swinging supporting arm 29 and is rigidly welded thereto as at 30.

As clearly shown in FIG. 2, a motor supporting member 32, of non-circular cross section, preferably square, is inserted through a suitable opening in the swinging arm 29 and is rigidly welded thereto as at 33. Slidable on the supporting member 32 is a pair of supporting sleeves 34, corresponding in cross sectional shape to the supporting member 32. One of the sleeves 34 is provided with a projecting member 35 through which is threaded a set screw 36 engageable with the supporting member 32 to prevent the associated sleeve 34 from sliding from an adjusted position relative to the supporting member 32.

Two motor mount rods 38 and 39 are mounted above the respective sleeves 34 and are rigidly welded thereto as at 40. Obviously the rods 38 extend transversely of the supporting member 32 and are parallel to each other. A plurality of motor mount slides directly support the motor with respect to the rod mounts 38 and 39. Two of these slides, 41 and 42, slide on the mount 39 at spaced points therealong. The other two slides, 43 and 44, are similarly slidable on the mount 38.

Each of the slides 41 to 44 has welded to the top thereof the head 45 of a bolt 46. These bolts have their threaded shanks adapted for insertion upwardly through the usual bolt openings in the base 47 of a motor 48 shown in dot and dash lines in FIG. 1. This motor of course is conventional and is shown in the present instance as a gasoline motor. After the motor has been placed in position, nuts 48 are screwed down on the bolts 46.

Means are provided for fixing the mounts 38 and 39 in any horizontal position regardless of the angularity of the conveyor 10. A sleeve 53 is slidably mounted on the frame member 12 and is provided with a longitudinal projection 54 in which is threaded a set screw 55 adapted to engage the frame member 12 to fix the sleeve 53 in any adjusted position. The sleeve 53 is provided with an eye 56 adapted to receive a transverse short section 57 of a rod 58, the short section 57 offsetting from the body of the rod 58 the extremity 59 thereof. The other end of the rod 58 is provided with a short transverse section 60 adapted to extend through an opening 61 in the lower end of the swinging arm 29, the latter end of the rod having an offset extremity 62. The short sections 57 and 60 pivotally connect the ends of the rod 58 respectively to the eye 56 and the lower end of the support 29 and the offset ends 59 and 62 prevent displacement of the rods from the openings referred to.

The mount 38 adjacent to the conveyor is provided above and below the extremity thereof remote from the observer in FIG. 2 with apertured discs 65 and 66 rigidly connected to the mount 38. A clutch lever 67 has an end portion formed with a short vertical shaft 68 pivoted in the holes of discs 65 and 66 to pivotally connect the clutch lever thereto. This lever is provided with an arm 71 welded thereto and provided with an opening 72 through which extends a threaded stem 73 connected to an operating handle 74. The stem 73 is rotatable in the opening 72. A force-transmitting rod 76 is slidable through a crosshead 77 adapted to be fixed in any suitable position along the rod 76 by a set screw 78. An upstanding internally threaded boss 79 is adapted to receive the lower end of the stem 73 when the parts are assembled.

The motor slide 44 is provided therebeneath with an eye 82 adapted to receive the transversely extending portion 83 of the rod 76. The rod 76 has its extremity 84 offset from the road 76 for the same purpose as the rod extremities 59 and 62.

As previously stated, the motor and conveyor are conventional. The motor has a pulley 88 preferably coaxial with the tubular member 27. A belt 89 passes around this pulley and around a pulley wheel 90 rotatably supported by the conveyor frame on a shaft 91 adapted to drive a shaft 92 at a reduced speed through the medium of a chain 93. The shaft 92 conventionally carries the sprockets around which the chains 19 pass.

*Operation*

With the parts assembled and with the clutch lever 67 in the position shown in FIG. 2, and with the set screw 78 loosened, the slides 41–44 may be moved longitudinally along the mounts 38 and 39 to position them according to the spacing of the motor base openings which are to receive the bolts 46. Similarly the sleeves 34, with the set screw 36 loosened, may slide relative to each other and to the support 32 to position the bolts 46 according to the spacing of the bolt openings of the motor base transversely of the conveyor. The motor is then placed in position with its base resting on the heads 45, whereupon the nuts 49 are applied and tightened. The slides 41–44 are preferably so positioned before turning the nuts 49 that the axis of the pulley 88 is coincident with the tubular member 27, as stated above, in the tight-belt position.

The stem 73 will now be inserted in the opening in the boss 79, the crosshead 77 being moved along the rod 76 to properly position it relative to the stem 73. The set screw 78 is now tightened, and with the motor operatively connected to the pulley wheel 90 through the belt 89, the mechanism is now ready for operation. Of course, the gravitational effect of the motor on its supporting structure will swing the depending arm 29 as may be necessary so that it assumes a vertical position, and the set screw 55 is tightened to fix the swinging support 29 against movement.

The lever 67 is shown in full lines in FIG. 2 in the "clutched" position. The belt is tight, and in this position the lever 67 has moved the pivot axis 73 slightly over-center from the center line of support 38, in the clockwise direction, and lever 67 is now held locked by the belt tension. Further clockwise movement of lever 67 is prevented by the fact that the lever rests against the right edge of the end of support 38. To loosen the belt 89, the lever 67 is swung toward its dash-line position, away from the observer in FIG. 2. This action, through the stem 73, moves the crosshead 77 back or counter-clockwise past dead center, and further motion thereof moves rod 76 (and the slide 44 at the far end of the slide rod or motor mount 38) forward on that mount. Since all of the slides 41–44 are fixed to the motor and thus fixed with respect to each other, the operation of the clutch rod moves the motor together with the slides 41–44 towards the pulley wheel 90 to loosen the belt 89. This action takes place with the axis of the stem 73 moving past the line connecting lug 82 and pivot 68, thus releasing the over-center operation which otherwise maintains the belt 89 tight. Conversely, when it is desired to clutch the motor to the pulley wheel 90, the clutch lever 67 is swung back to the position shown in full lines in FIG. 2, and thus the motor 48 slides away from the observer to the position of FIG. 2 to tighten the belt 89 and lock the lever 67 in clutched position.

If it is desired to tilt the conveyor at a different angle to the horizointal, the set screw 55 is loosened to allow the sleeve 53 to slide along its frame member 12. Thus support 29 is adapted to swing relative to the conveyor frame to remain in a vertical position while the conveyor is being tilted at a different angle. When the conveyor angle is adjusted as desired, the set screw 55 is tightened with the motor mounts 38 and 39, and consequently the motor base, in horizontal position.

From the foregoing it will be apparent that the present construction provides a highly simplified means for maintaining level the motor support of a conveyor of the present or any similar type. The only element necessary for connecting the motor support to the conveyor frame to support the weight of the motor is the tubular member 27, arranged in the tubular member 25, together with the cotter pin 28 for preventing longitudinal displacement of the tubular member 27. The weight of the motor, when the set screw 55 is loosened, will cause the swinging arm 29 to turn on the axis of the tubular member 27 whenever the angle of inclination of the conveyor is changed. It is thus merely necessary to loosen the set screw 55, tilt the conveyor as desired, and then tighten the set screw 53. To prevent movement of the motor mount longitudinally of the support 32, it is merely necessary to tighten the set screw 36. This one screw is all that is necessary to prevent the motor and the elements connected thereto from moving longitudinally of the support 32 since the connection of the bolts 46 to the motor base fixes with respect to each other the bolts 46, the sleeves 41–44 and the sleeves 34.

As previously stated, the axis of the tubular member 27 is preferably coincidental with the axis of the motor shaft when the belt is tight. This position is easily attained by adjusting the motor, after it is connected to the bolts 46, longitudinally of the mounts 38 and 39 with the set screw 78 loosened. With the motor so positioned, it will be apparent that if the angle of the conveyor to the horizontal is changed and the set screw 55 loosened to provide for the horizontal positioning of the motor and its support, the swinging of the motor support is about an axis substantially coincidental with the axis of the motor shaft. Therefore, this adjustment takes place substantially without any loosening or tightening of the belt 89.

It is to be understood that the form of the invention shown and described is to be taken as a preferred example of the same and that various changes in the shape, size,

What is claimed is:

1. A motor mount comprising a depending arm, a horizontal rockable member fixed at one end to the upper end of said arm and projecting laterally therefrom, means supporting said member for rocking movement on its own axis, a supporting bar member fixed at one end to said arm adjacent its lower end and projecting therefrom laterally in the direction opposite said rockable member, said supporting bar member being of polygonal cross section, a pair of spaced parallel elongated motor mounts arranged over and supported intermediate their lengths by said supporting bar member, at least one of said motor mounts having a sleeve to which it is fixed and which sleeve corresponds in cross sectional shape to said supporting bar member and surrounds the same to slide thereon toward and away from the other motor mount, means for fixing said sleeve in adjusted position along said supporting bar member, a pair of longitudinally slidable sleeves surrounding each motor mount and having means for connecting them to a motor, and means connected between the lower end of said arm and a stationary point for fixing said arm against swinging movement to maintain said motor mount horizontal.

2. In combination with a tiltable conveyor having frame members, endless conveying means, and a rotary driving member for said conveying means, a horizontal tubular member fixed to certain of said frame members and projecting from one side of the conveyor, a rockable member projecting through said sleeve, a swinging arm fixed at its upper end to said rockable member, a horizontal supporting arm fixed at one end to said swinging arm near the lower end thereof and projecting therefrom in the direction opposite said rockable member, a pair of elongated parallel motor mount bars slidably and non-rotatably supported intermediate their lengths on said supporting arm and extending transversely thereof, for movement relatively toward and away from each other, a pair of slides mounted on each motor mount, the slides of each motor mount being movable toward and away from each other, a motor attaching element carried by and projecting upwardly from each slide for attachment to a motor base which fixes said attaching elements against movement relative to each other, the motor when attached to said slides having its drive shaft substantially coincidental with the axis of said rockable member, said swinging arm and said supporting arm constituting a unit adapted to swing about the axis of said rockable member, and means connected between said unit and one of the said frame members for fixing said unit against said swinging movement.

3. The combination defined in claim 2 wherein the motor is adapted to be connected to said rotary member by an endless driving member, a clutch lever pivotally connected to one of said motor mount bars adjacent one end thereof, a connecting pin carried by said clutch lever at a point eccentric to the pivot axis thereof, a crosshead with which said pin is connected, and a rod on which said crosshead is adjustably mounted, one end of said rod being pivotally connected to one of said slides to effect movement of the motor toward and away from said rotary member to tighten or loosen said endless driving member upon operation of said clutch lever, without disturbing the angular swinging adjustment of said swinging arm.

References Cited in the file of this patent

UNITED STATES PATENTS

| | | |
|---|---|---|
| 1,926,392 | Kritzer | Sept. 12, 1933 |
| 2,444,521 | Mulkey et al. | July 6, 1948 |
| 2,551,147 | Mayrath | May 1, 1951 |
| 2,623,624 | Slocum | Dec. 30, 1954 |
| 2,831,566 | Beldin et al. | Apr. 22, 1958 |